Figure 1:
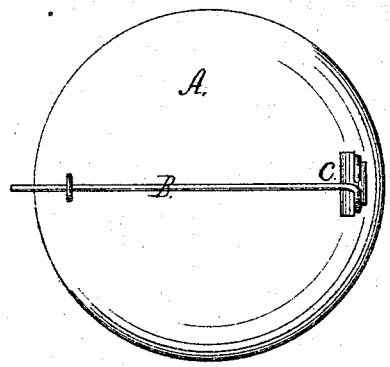

D. O. STANLEY'S
IMPROVED
JOINT FOR BREAST PINS.

No. 120,601.                                      Patented Nov. 7, 1871.

WITNESSES,                                       INVENTOR,

Walter B. Vincent

Henry Tilden

Daniel O Stanley

AM. PHOTO-LITHOGRAPHIC CO. N.Y. (OSBORNE'S PROCESS.)

UNITED STATES PATENT OFFICE.

DANIEL O. STANLEY, OF SOUTH ATTLEBOROUGH, MASSACHUSETTS.

IMPROVEMENT IN JOINTS OF BREASTPINS.

Specification forming part of Letters Patent No. 120,601, dated November 7, 1871.

*To all whom it may concern:*

Be it known that I, DANIEL O. STANLEY, of South Attleborough, in the State of Massachusetts, have invented a new and Improved Joint for Breastpins; and I do hereby declare that the following specification, taken in connection with the drawing making a part of the same, is a full, clear, and exact description thereof.

Figure 2:
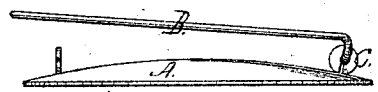
Figure 3:
Figure 4:

Figure 1 is a view of the back of the pin in elevation. Fig. 2 is a side view of same. Figs. 3 and 4 show my improved joint detached.

The object of my invention is to provide what is generally known as brooches or breastpins with a joint superior to those now in use, and which can be made with much less trouble and expense; and consists in the device for such purpose hereinafter described.

A is the back plate; B, the pin; and C, the joint.

I construct the joint C by taking a piece of hollow tube, as shown in Fig. 3, and burin it at each end so as to form two shoulders, $d\ d$, and then attach it to the plate A; after which I place in the pin and bend it up, as shown in Fig. 1. It will now be readily seen that as the pin B is pressed toward the plate A the crooked end will bring up against the shoulders $d\ d$, as shown in Fig. 2, before the pin reaches the catch, so that the necessary continued pressure to fasten it gives to the pin sufficient elasticity.

What I claim as my invention, and desire to secure by Letters Patent, is—

A joint, C, made from a hollow tube, and having two shoulders, $d\ d$, in combination with the plate A and the pin B, the whole constructed and arranged in the manner substantially as described, for the purposes specified.

DANIEL O. STANLEY.

Witnesses:
WALTER B. VINCENT,
HENRY TILDEN.

(86)